United States Patent [19]

Fern

[11] 3,940,046

[45] Feb. 24, 1976

[54] SOLDERING APPARATUS

[75] Inventor: Robert W. Fern, Toledo, Ohio

[73] Assignee: Libbey-Owens-Ford Company, Toledo, Ohio

[22] Filed: Mar. 20, 1974

[21] Appl. No.: 452,985

[52] U.S. Cl. ...................... 228/8; 219/203; 228/41; 228/52; 228/56.5

[51] Int. Cl.[2] ........................ B23K 3/00; B23K 3/06

[58] Field of Search ............ 219/85, 203; 228/8, 12, 228/18, 33, 41, 51, 52, 56.5

[56] References Cited

UNITED STATES PATENTS

| | | | |
|---|---|---|---|
| 2,726,616 | 12/1955 | Downing | 228/41 X |
| 3,521,804 | 7/1970 | Jacobs | 228/51 |
| 3,797,725 | 3/1974 | Mori et al. | 228/51 X |
| 3,830,420 | 8/1974 | Milana et al. | 228/41 X |

*Primary Examiner*—Al Lawrence Smith
*Assistant Examiner*—James G. Smith
*Attorney, Agent, or Firm*—Collins, Oberlin & Darr

[57] ABSTRACT

An apparatus for use in the manufacture of plastic sheets to be used as interlayers in laminated antenna-windshield structures including a soldering apparatus suspended above and associated with a wire laying apparatus for operation in conjunction therewith to solder a connecting plate to the antenna wire elements laid and embedded into the plastic sheet by the wire laying apparatus. The soldering apparatus is provided with guide pins insertable into the work table supporting the plastic sheet for effecting operation of the soldering apparatus to deliver solder to the workpieces and effect the bond therebetween.

15 Claims, 6 Drawing Figures

SOLDERING APPARATUS

BACKGROUND OF THE INVENTION

1. Field of the Invention

The present invention relates generally to the manufacture of laminated glass windshields with built-in antennas and, more particularly, to an apparatus for soldering a metallic connecting tab to the wire elements forming the windshield antenna.

2. Description of the Prior Art

In recent years, the use of built-in antennas as an integral part of windshields have become increasingly popular and are gradually replacing the familiar flexible, telescoping rod type antennas, which were mounted exteriorly of an automobile adjacent the right front fender thereof and were extremely susceptible to breakage and pilferage. In perhaps their most popular form, the antenna portions of these antenna windshields are made up of two substantially inverted L shaped lengths of wire which are positioned back-to-back and embedded in the plastic interlayer of an otherwise conventional laminated glass windshield. This form of antenna gives adequate radio reception and, at the same time, is optically acceptable in a windshield because it does not materially affect the appearance or obstruct vision therethrough.

Machines have been developed to apply the antenna wires to and embed the same automatically in the plastic interlayers in precise patterns on successive sheets, as a large volume operation. The free end portions of the antenna wires which project slightly beyond the forward marginal edge of the plastic interlayer, are wrapped about a thin metallic connecting plate or tab and ultimately secured thereto by soldering.

Conventionally, the wires were soldered to the tab at a station remote from the wire laying station and after final lamination. This required the tab to be fixed in place on the antenna wires and embedded in the plastic interlayer by heat and pressure between the various windshield assembling operations. The labor involved and the accessory equipment required in such repeated handling materially increases production costs. Moreover, the loose ends of the antenna wires, which are left dangling beyond the forward marginal edge of the plastic sheet during such repeated handling, often are frayed, broken or otherwise damaged to yield defective and unacceptable products.

SUMMARY OF THE INVENTION

Accordingly, it is a primary object of the present invention to obviate the above noted disadvantages by providing a new and useful soldering apparatus for securing connecting tabs to antenna wires in conjunction with a wire laying apparatus for sequential operation therewith at a single station.

It is another object of this invention to render the foregoing soldering apparatus automatically operable upon the proper positioning thereof relative to a work table to effect the soldering operation.

It is a further object of the present invention to provide the foregoing soldering apparatus with selectively operable means for periodically removing excess solder from the soldering iron tip.

In one aspect thereof, the soldering apparatus of this invention is characterized by the provision of a pivotal electrical soldering iron triggered for movement in response to the energization of spaced microswitches actuated only when the apparatus and consequently the soldering iron is properly aligned with the work. The heated soldering iron moves in an arcuate path removing a discrete amount of solder from the end of an intermittently fed, continuous strip and delivering the same in a molten state to the workpieces. An axially displaceable wiper element is periodically actuated to remove accumulated solder from the soldering iron tip and wipe the same clean.

Further and more detailed objects and advantages of the invention will become apparent in the course of the following description when taken in connection with the accompanying drawings.

BRIEF DESCRIPTION OF THE DRAWINGS

In the drawings, wherein like numerals are employed to designate like parts throughout.

DESCRIPTION OF THE PREFERRED EMBODIMENTS

Figure 1:
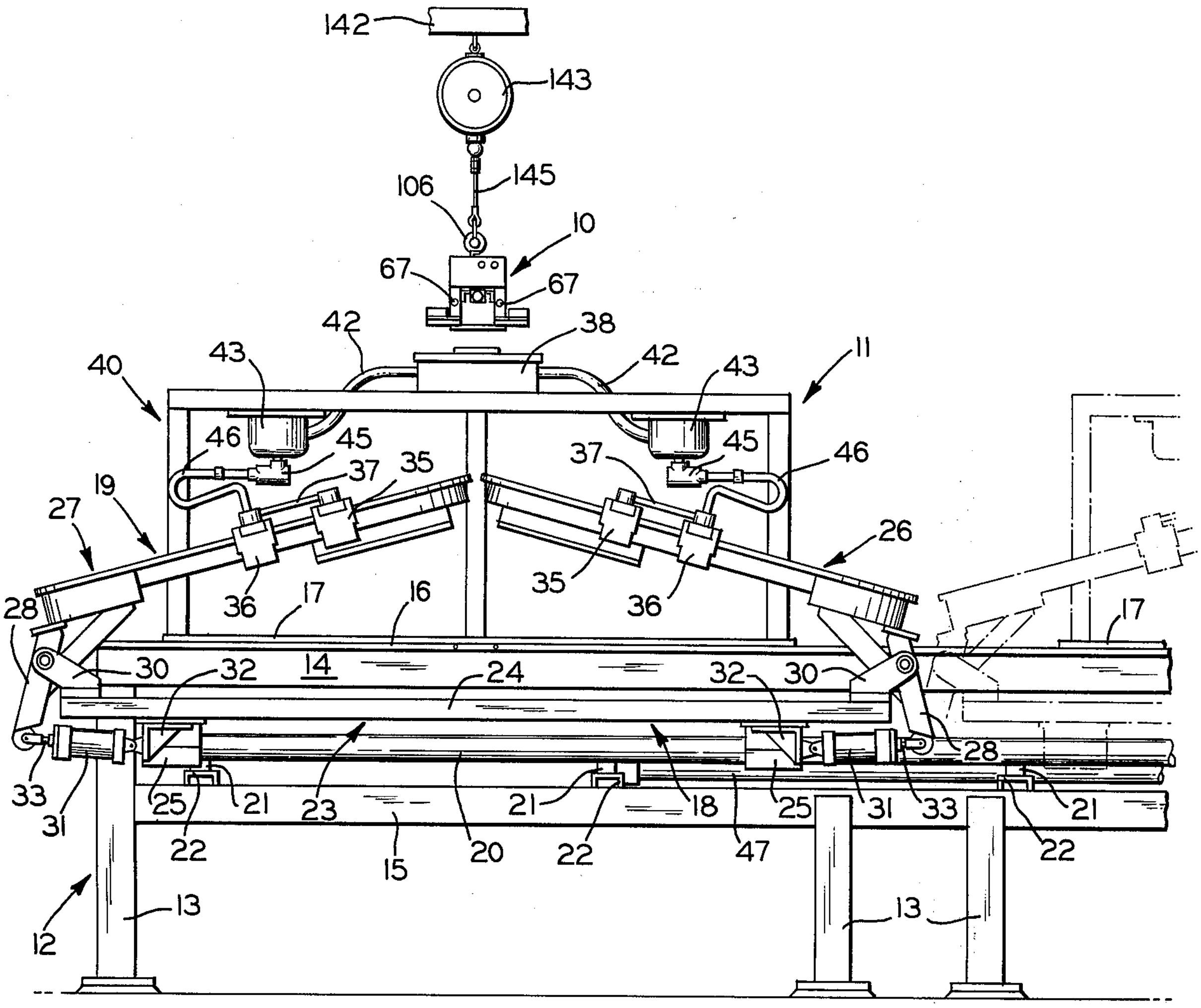
FIG. 1 is a front elevational view from the operator's position of a soldering apparatus constructed in accordance with this invention, shown associated with a wire laying apparatus.

Referring now in detail to the illustrative embodiment depicted in the drawings, there is shown in FIG. 1 a soldering apparatus, generally designated 10 and constructed in accordance with this invention, associated with an antenna wire laying apparatus, comprehensively designated 11. Apparatus 11 comprises a frame 12 including a plurality of upstanding legs or posts 13 connected at their upper ends by external, longitudinally extending, horizontal structural members 14 and, intermediate their ends, by internal longitudinally extending, horizontal structural members 15. Suitable transversely extending structural or cross members (not shown) are welded or otherwise fixedly secured at their respective opposite ends to structural members 14 and 15, respectively.

In addition to supporting the antenna wire laying apparatus 11, hereinafter described, frame 12 also supports a table 16 upon which are located the templates or patterns 17 for receiving and positioning the plastic sheets into which the antenna wires are embedded.

Frame 12 also supports a carriage 18, carrying the wire laying mechanism, generally designated 19, and mounted for reciprocal movement above table 16 on elongated, rod-like track or slide elements 20 extending along the opposite sides of frame 12 and supported, by brackets 21, on the ends of a series of relatively small channel members 22, which are mounted on and extend transversely of the intermediate structural members 15. The carriage 18 comprises a rectangularly shaped frame 23 made up of a plurality of hollow beam members 24 located between the upper and intermediate structural members 14 and 15 and mounted for reciprocal movement along the slide elements 20 by means of guides 25 depending from the frame beam members 24 and embracing the slide elements 20.

The wire laying mechanism 19 includes a pair of track templates 26 and 27 pivotally mounted by means of supporting bracket arms 28 between post brackets 30 extending upwardly and outwardly from the carriage 18, and swingable between the upper inoperative position of rest shown in FIG. 1 and a lowered operative position (not shown) by air cylinders 31 carried by brackets 32 depending from the carriage 18 and equipped with plungers 33 attached at their outer ends to the lower end of the bracket arms 28. Mounted in tandem for movement on and along each of the track templates 26 and 27 are a preheating head 35 and a wire laying head 36 connected together for movement as a unit by a flexible cable 37. A junction box 38 is carried by an upstanding frame 40 and is connected to a suitable source of electrical power (not shown) for delivering current through conductor cables 42 to distributor boxes 43, which in turn distribute the same through swivel power units 45 and cables 46 to the preheating and wire laying heads 35 and 36 associated with each of the track templates 26 and 27.

The carriage 18 is reciprocated between the full and broken line positions (the latter shown fragmentarily in FIG. 1) by means of a horizontally arranged hydraulic cylinder 47 mounted on frame 12 and having a suitable piston (not shown) movable within cylinder 47 a distance substantially corresponding to the travel of carriage 18. The cylinder piston rod can be connected to carriage 18 by any suitable means, such as a cable-pulley arrangement for example, also not shown. Thus, the wire laying mechanism 19 is reciprocated back and forth over the table 16 above the spaced patterns 17 to permit the replacement of a completed wired plastic interlayer by an unwired plastic interlayer on the pattern 17 at one end of table 16 while wire antenna elements are being incorporated in still another plastic interlayer disposed on the pattern 17 at the other end of table 16.

In operation, a sheet of plastic 50 (FIG. 2) is placed on the pattern 17 at one end of table 16 and located so that the edges of the plastic sheet 50 coincide with the edges of the pattern platform, the position of the latter relative to the front end of table 16 being selectively adjustable by means of slotted guides 48. The wire laying mechanism 19 is then moved to the position shown in full lines in FIG. 1 to bring it over such pattern 17, and then operated to incorporate wire antenna elements 51 and 52 into the plastic sheet 50. While this is being done, another plastic sheet 50 will be located on the pattern platform 17 at the other end of table 16 and, upon completion of the wire laying cycle over the first pattern 17, the wire laying mechanism 19 will be moved to the broken line position over the second pattern 17.

The actual laying of the wire elements 51 and 52 on and the embedding of them into a plastic interlayer 50 on one of the pattern platforms 17, when the mechanism 19 is positioned thereabove, is done by the heads 35 and 36 during their travel along the track templates 26 and 27 at a time or times when the templates are in their lowered positions substantially parallel to the sheet 50.

Figure 2:
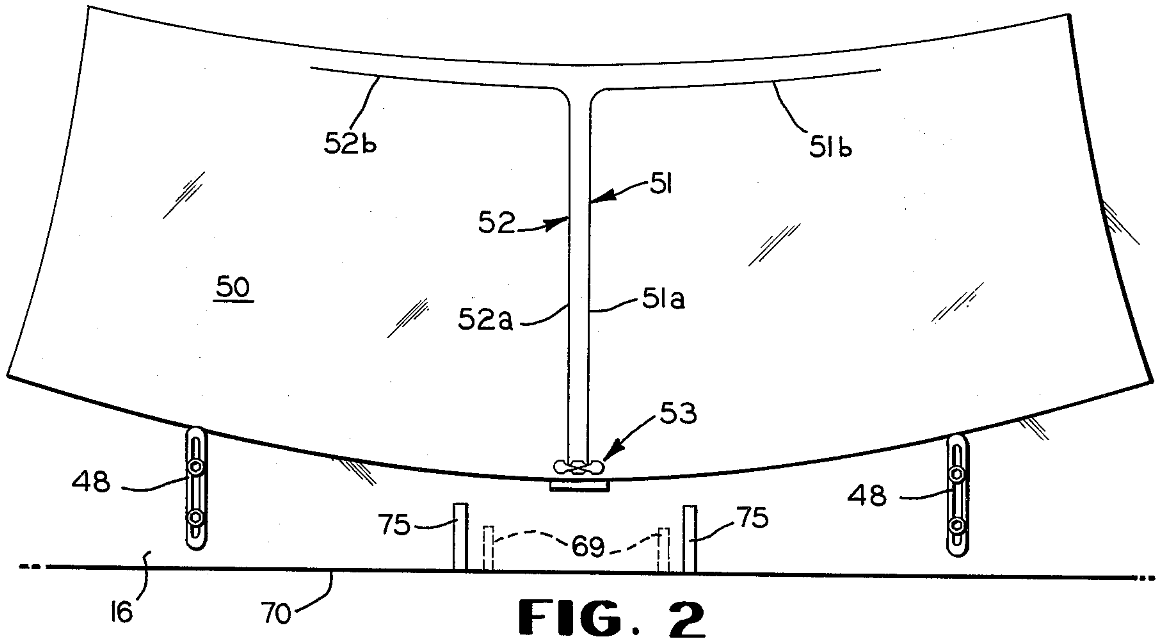
FIG. 2 is a plan view of a typical plastic interlayer for a laminated glass windshield onto which antenna wires and the connecting tab therefor have been placed in position for soldering by the apparatus of this invention.
Figure 3:
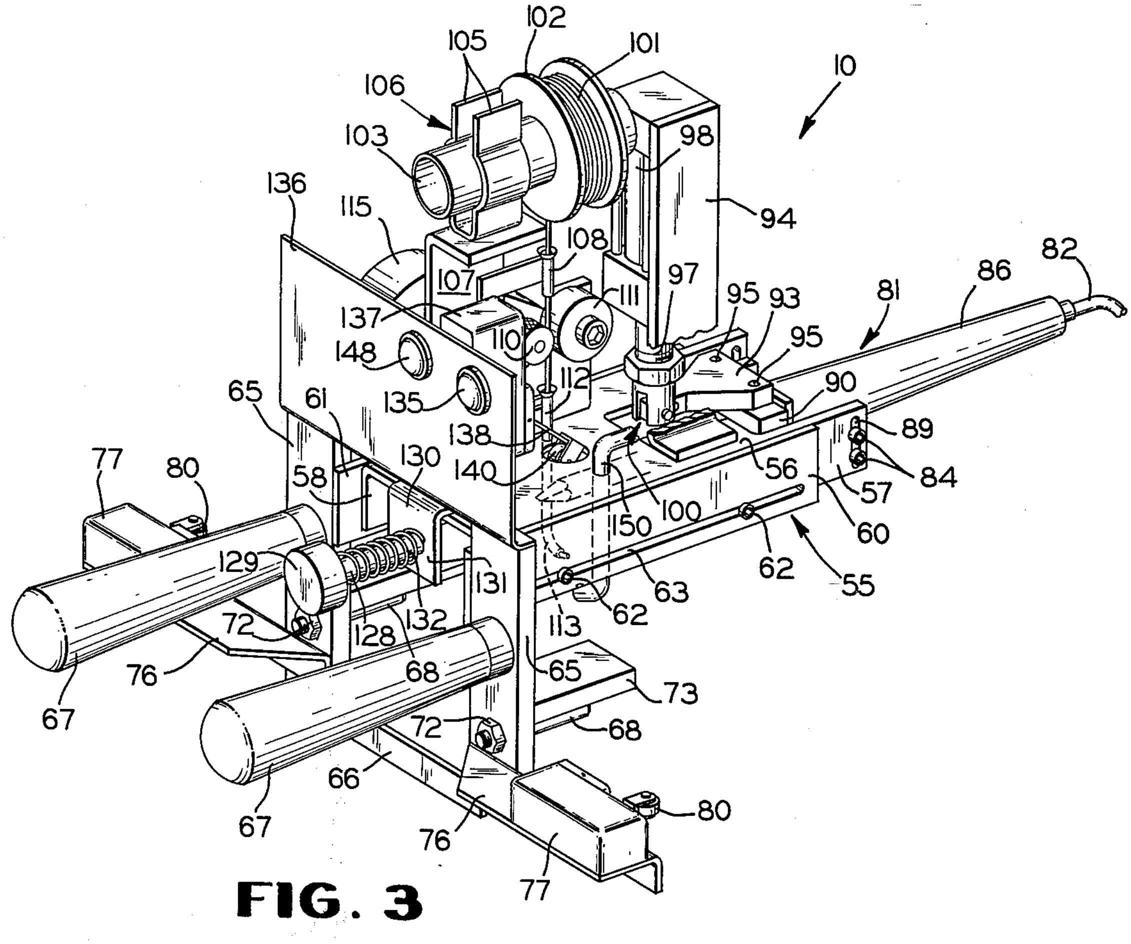
FIG. 3 is an enlarged perspective view of the soldering apparatus of this invention, showing the soldering iron in an elevated position of rest.

The heads 35 and 36 are connected together for movement in tandem as a unit along the associated template. However, in order to produce the antenna wire pattern shown in FIG. 2, whereby the vertical legs 51 and 52 of the pattern are in close proximity, the track templates 26 and 27 must be so located relative to one another that only one of them can be in its lowered or operative position at a time. Accordingly, with track template 26 lowered, and the motors of the respective heads 35 and 36 energized, the heads will advance along template 26. As the heads 35 and 36 move onto and over the plastic sheet 50, the preheating head 35 heats and softens the surface of the plastic sheet 50 along the path in advance of the head 36, which lays a length of wire onto the heated path and presses the same into the heated plastic sheet 50. Means (not shown) are provided on the table 16 to coact with wire laying head 36 for severing the wire element 51 at a predetermined point. The wire is laid in a generally inverted L-shaped path to form a vertical leg 51a and a horizontal leg 51b as shown in FIG. 2.

After the wire element 51 has been severed and the heads 35 and 36 travel along template 26 and return to their initial starting positions, the track template 26 is swung upwardly to the angularly and operative position shown in FIG. 1 and track template 27 is swung downwardly from its operative position to a horizontal operative position substantially parallel to the sheet 50 for laying and embedding the wire element 52 in place in plastic sheet 50. The track template 27 is a mirror image of track template 26 and the heads 35 and 36 associated therewith are operative precisely in the same manner as those associated with the track template 26 except that the former are moved in an opposite direction. When the track template 27 is raised after completion of its phase of the wire laying operation, carriage 18 is moved from the full line to the broken line position shown in FIG. 1, whereat a fresh set of antenna wire elements 51 and 52 will be incorporated in another plastic sheet 50.

After wires 51 and 52, or at least the portions 51a and 52a thereof, have been laid, a thin, flat, elongated metal connecting plate or tab 53 (FIG. 2) of a highly conductive metal, such as thin sheet copper or steel for example, is placed upon the vertical legs 51*a* and 51*b* adjacent their lower ends for subsequent securement thereto. Conventionally, the metal tab 53 has been placed in position at a station remote from the wire laying station after the sandwich has been formed and prepressed but before final lamination. The tab 53 is fixedly secured to the antenna wire elements 51 and 52 by a soldering operation at a still further remote station.

In accordance with the present invention, the soldering apparatus 10 is physically associated with the wire laying apparatus 11 and operative, in conjunction therewith, to solder the connecting tab 53 to the antenna wires 51 and 52 immediately after such wires are laid and their respective loose ends wrapped about the tab 53 placed thereon at the wire laying station. The tab 53 preferably is placed in position on the wires 51 and 52 automatically by means of a tab laying machine, such as that disclosed in the co-pending application Ser. No. 443,479, filed Feb. 19, 1974, and assigned to the same assignee as the present application. However, the tab 53 can be positioned manually and affixed to the plastic interlayer by a suitable heated tool, if desired. In either event, the soldering apparatus 10, hereinafter described in detail, is operative to effect the securement of such tab 53 to the antenna wires 51 and 52 before removal of the plastic sheet 50 from table 16.

Soldering apparatus 10 includes a frame, generally designated 55 (FIGS. 3–6), for supporting a mounting plate 56 disposed in a generally horizontal plane and having a pair of side walls 57 and 58 depending downwardly therefrom. The frame 55 includes a pair of side support plates 60 and 61 connected to the mounting plate side walls 57 and 58 by means of fasteners 62 extending through longitudinal slots 63 formed in the side support plates 60 and 61 for axial adjustment of the mounting plate 56 relative to the frame 55. Suitably secured to the outer surfaces of the side plates 60 and 61 adjacent their forward ends are a pair of laterally spaced, upright support bars 65 connected together at their lower ends by a cross tie bar 66 welded or otherwise fixedly secured to the outer faces of bars 65. A pair of laterally spaced handles 67 are secured to the support bars 65, respectively, and extend outwardly and forwardly therefrom to form a pair of hand grips for manually manipulating the soldering apparatus 10, which is supported from an overhead superstructure, as will hereinafter be described.

In order to properly align and orient the soldering apparatus 10 relative to the work, a pair of laterally spaced apart locating pins 68, mounted on the upright support bars 65, extend outwardly rearwardly therefrom in a direction opposite to the handles 67 and are adapted to be inserted in spaced bores 69 formed in the front face 70 of table 16 and extending inwardly therefrom as shown in FIG. 2. Each of the locating pins 68 is provided with a reduced diameter portion 71 extending through its associated support bar 65 and having a threaded end portion for receiving a nut 72 to secure the same on the bar 65. A pair of support blocks 73 are welded or otherwise fixedly secured to the rear faces of bars 65 and extend rearwardly therefrom above the locating pins 68 in substantial parallelism thereto. The lower surfaces of the support blocks 73 are adapted to engage the upper surface of table 16 and rest thereon upon complete insertion of the pins 68 in bores 69 to properly support apparatus 10 on table 16 in the desired orientation relative to the work prior to the soldering operation. The blocks 73 also are referenced to guide strips 75 located on the upper surface of table 16 (FIG. 4) to assist in initially aligning the locating pins 68 with their associated bores 69.

A pair of angle brackets 76 are rigidly secured to the front face of the support bars 65, respectively, as by welding for example, for supporting a pair of microswitches 77 connected to a suitable source of electrical power (not shown). Each switch 77 is provided with a pivotal actuating lever 78 normally biased outwardly and provided with a roller 80 engageable with the front face 70 of the table 16. Engagement of the rollers 80 against the table front face 70 cause the actuating levers 78 to pivot, closing switches 77 and thereby completing a control circuit (not shown) to initiate operation of the soldering apparatus 10. The purpose of employing two microswitches 77 at relatively widely spaced apart positions is to assure proper alignment of the soldering apparatus 10 and the soldering iron incorporated therein relative to the work prior to the automatic soldering operation.

An electric soldering iron 81, connected to a suitable source of electrical power (not shown) by means of an insulated conductor 82, is mounted on the frame 55 below the mounting plate 56 and extends in a generally horizontal direction parallel to the handles 67 and toward the upright support bars 65. The soldering iron 81 comprises a shank 83 terminating at its forward end in a tapered or screwdriver-style tip 85 and connected at its rear end to an insulated, rearwardly tapering handle 86 having a suitable bore through which the conductor 82 extends.

Figure 6:
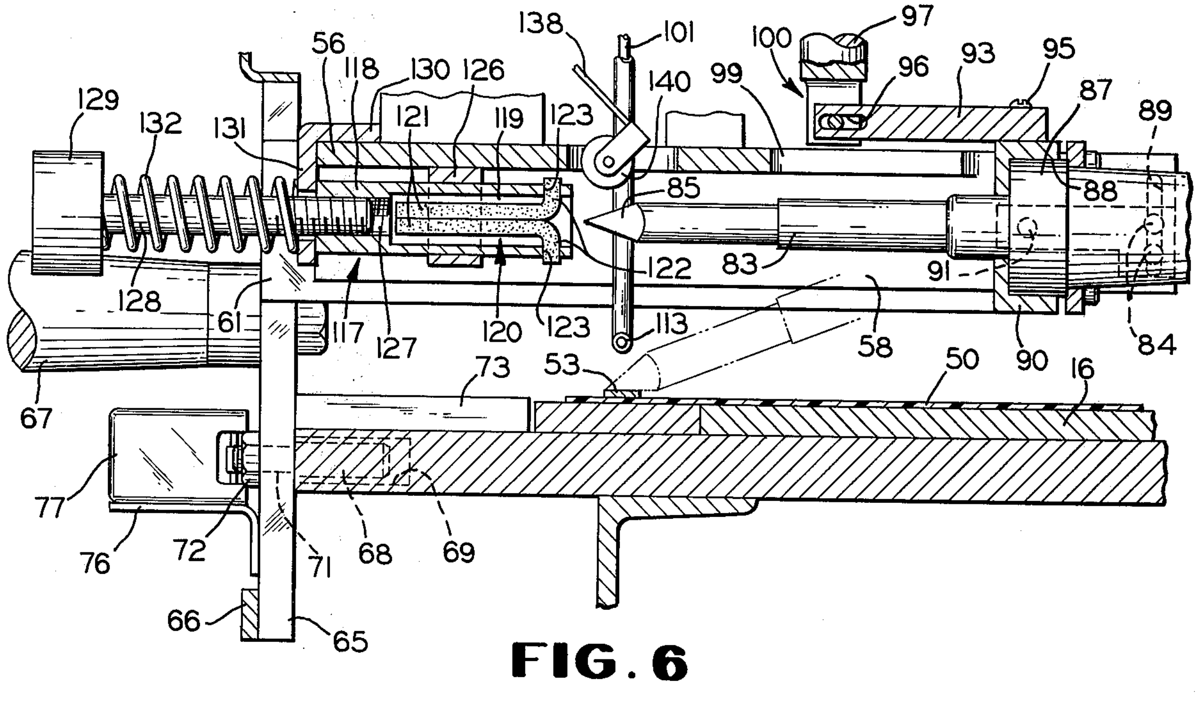
FIG. 6 is a vertical sectional view similar to FIG. 5, but shown fragmentarily on an enlarged scale.
Figure 4:
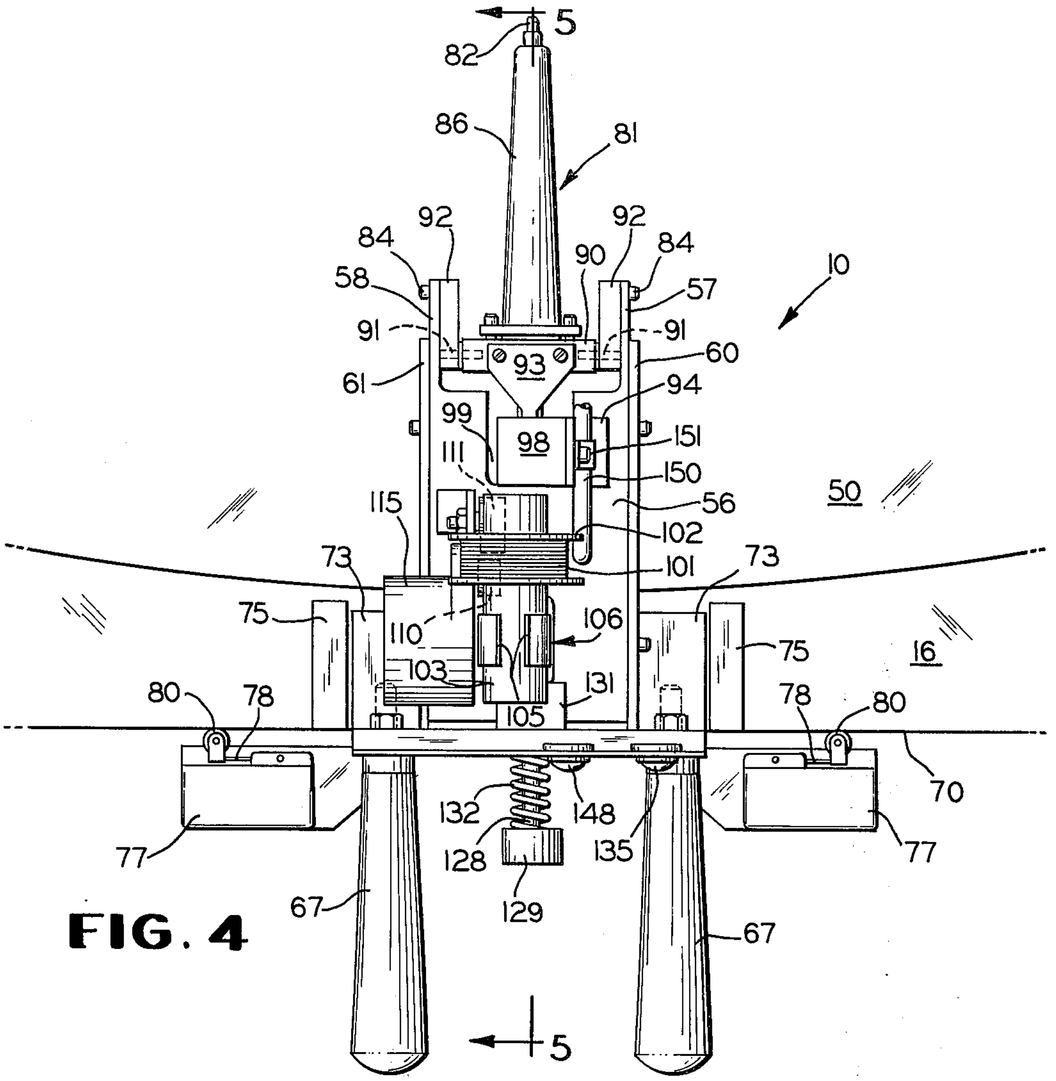
FIG. 4 is a top plan view of the soldering apparatus of FIG. 3.
Figure 5:
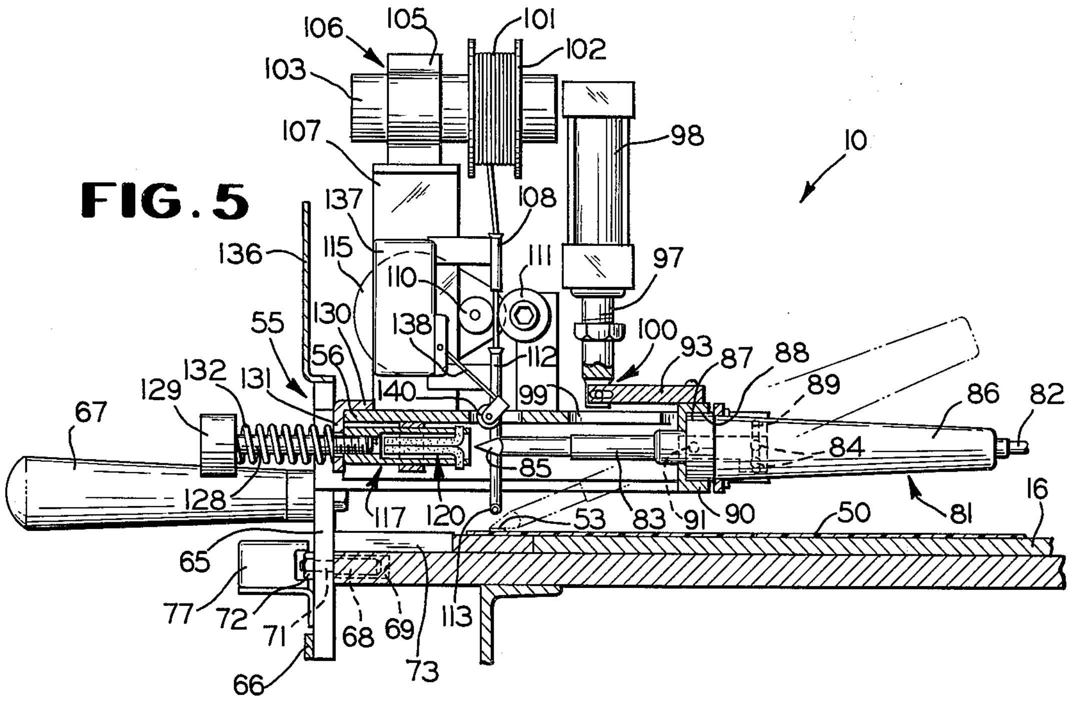
FIG. 5 is a vertical sectional view taken substantially along the line 5—5 of FIG. 4.

The soldering iron 81 is mounted for pivotal movement between an elevated, generally horizontally extending inoperative position of rest and a lowered, inclined operative position of use shown in full and broken lines, respectively, in FIGS. 5 and 6. To this end, the central enlarged diameter portion 87 of soldering iron 81 is received within an annular cavity 88 (FIGS. 5 and 6) formed in a support block 90. The support block 90 is journalled for pivotal movement at the opposite sides thereof on a pair of pivot pins 91 projecting inwardly from a pair of blocks 92 removably secured to the inner face of mounting plate side walls 57 and 58, by means of threaded studs 84 projecting laterally outwardly from blocks 92 and extending through elongated, vertical slots 89 formed in the mounting plate side walls 57 and 58. This stud and slot arrangement enables the soldering iron 81, through its connection with blocks 90 and 92, to be selectively raised or lowered relative to the mounting plate 56 to provide a fine adjustment, assuring that the flat tapered portion of tip 85 engages the work with a flush fit, as shown in FIG. 6. A lever 93 is secured to the upper surface of block 90 by suitable fasteners 95 and is provided at the other end thereof with a relatively narrow slotted end portion 96 connected to the piston rod 97 of a single acting, spring loaded actuating cylinder 98 by means of a clevis and pin arrangement 100. The cylinder 98, attached to a plate 94 secured on the mounting plate 56, is actuated to extend the piston rod 97 and thereby pivot lever 93 and soldering iron 81 downwardly in an arcuate path in response to the energization of the control circuitry effected by the closing of the microswitches 77. An opening 99, formed in the mounting plate 56, provides the necessary clearance for the piston rod clevis and lever 93 connection during downward movement thereof. The circuit also is provided with a suitable timer (not shown), suitably mounted on a control panel (not shown) which operates the conventional fluid control valve for cylinder 98 to maintain the soldering iron 81 in its downwardly inclined operative position for a predetermined period of time and then times out to shift the control valve and allow the spring biased piston rod 97 to retract and return the soldering iron 81 to its raised position.

Solder is intermittently fed into the arcuate path of travel of the tip 85 of soldering iron 81 prior to the actuation thereof. To this end, a supply of solder in the form of a continuous strip 101 is wound upon a spool 102 rotatably mounted on a hollow shaft 103 detachably secured between the legs 105 of a U-shaped spring clip 106 mounted on the upper flange of the bracket 107, which is affixed at its lower end to mounting plate 56. The solder strip 101 is threaded through a guide tube 108 and then between the knurled drive wheel 110 and an idler wheel 111, the tractive force generated therebetween feeding the strip 101 axially through a second guide tube 112 having a curved end portion 113 terminating in an outlet which disposes the strip in a direction normal to the major portion of tube 112 and into the arcuate path of travel of the soldering iron tip 85. An electric motor 115, operative by means of a suitable timer (not shown) on the control panel and mounted on the vertical portion of bracket 107, drives wheel 110 through a suitable gear reduction mechanism having a common housing with the motor 115. The motor 115 becomes operative to drive wheel 110 for a limited period of time upon opening of the switches 77 by the disengagement of rollers 80 from the table front face 70 during the removal of soldering apparatus 10 from table 16 to feed a given increment of solder into said path of travel for engagement by the subsequently actuated soldering iron 81 during the next cycle.

Means are provided to periodically wipe soldering iron tip 85 for removing the excess accumulated solder therefrom. As best shown in FIG. 6, such means includes a wiper assembly 117 comprising a casing 118 having a chamber 119 therein for receiving a wiper element 120 comprised of a pair of strips 121 of suitable sponge material terminating in out-turned lips 122 received in diametrically opposed slots 123 formed in the casing 118. The common juncture between the inner portions of the lips 122 defines a generally tapered formation adapted to receive soldering iron tip 85 for wiping the excess solder therefrom. The casing 118 is mounted beneath the mounting plate 56 by a U-shaped clip embracing the casing 118 and having upper flanges 126 fixedly secured to the underside of plate 56.

The other end of casing 118 is formed to provide a tapped bore 127 communicating with chamber 119 and adapted to receive the threaded end of a rod 128 having an enlarged diameter head 129. An angle member 130 is secured to the forward end of the mounting plate 56 and has an opening in the vertical leg 131 thereof for guiding rod 128 therethrough. A coil spring 132 is disposed about rod 128 between leg 131 and head 129 for urging rod 128 and the wiper assembly 117 outwardly away from the soldering iron tip 85.

Rod 128 is manually shifted axially against the bias of spring 132 to bring the element 120 into wiping contact against the tip 85 of soldering iron 81. In order to maintain the soldering iron at optimum efficiency, it has been found desirable to clean the same at regular intervals after a given number of soldering operations, say about after every twentieth soldering cycle for example. To apprise the operator when such desired number of cycles has elapsed, a counter, located on the control panel (not shown) records the number of times the soldering iron control circuitry is energized and thereby the number of soldering cycles conducted. Upon attaining this predetermined number of cycles, the counter is operative to effect energization and illumination of an indicator lamp 135, mounted on an upstanding bracket 136 fixedly secured along a lower flange thereof to the upper ends of the upright support bars 65. Illumination of the lamp 135 indicates that the soldering iron tip 85 should be cleaned. Of course, the wiper assembly 117 can be activated at any time it is deemed necessary to clean the soldering iron tip 85. Also, water or any other suitable liquid may be periodically applied to the outer end of the wiper element 120 to maintain the same in a wetted condition for more effective wiping.

The counter is operatively connected to a microswitch 137 having a downwardly directed, pivotal actuating lever 138 provided with a roller 140 normally biased in the path of movement of wiper assembly 117.

When the latter is actuated and displaced axially, it engages roller 140 to trip lever 138 and close the switch 137 for returning the counter back to its starting position.

As shown in FIG. 1, the entire soldering assembly 10 is suspended from a structural beam member 142 forming a part of a building superstructure in which the apparatus 11 is located by means of a balancer or counterweight 143 and a cable 145 coupled to the soldering apparatus at one or more convenient points. The soldering assembly 10 is easily lowered manually with a minimum of effort by the operator from the elevated position shown in FIG. 1 to a lowered operative position adjacent the table 16.

In operation, the soldering apparatus 10 is lowered for use after the antenna wire and tab laying operations are completed and after the free end portions of antenna wires 51 and 52 have been wrapped about the connecting tab 53 in a predetermined pattern so as to cross or intersect substantially centrally thereof as shown in FIG. 2, for example. When lowered to the proper level, the operator manually manipulates apparatus 10 by means of handles 67 to align the outer edges of the support blocks 73 with the inner edges of indicating strips 75 on table 16 to align pins 68 with the table bores 69. Apparatus 10 then is moved forwardly with the pins 68 being inserted into the bores 69 and the blocks 73 overlying the upper surface of table 16. As the apparatus moves forwardly into the proper aligned position relative to table 16 and the work supported thereby, the rollers 80 engage the table front face 70 to effect pivotal movement of the levers 78 and consequent closing of microswitches 77, completing the control circuit and energizing the soldering iron control timer to initiate operation of soldering apparatus 10. An indicator lamp 148, located on the bracket 136 in laterally spaced relation to lamp 135, is energized at the same time as the soldering iron control timer to indicate that the soldering iron 81 is in operation. The lamp 148 remains lit as long as the soldering iron 81 is in the down or operative position. When the timer controlling the soldering iron times out, the soldering iron returns to its inoperative horizontal position and the lamp 148 is extinguished.

The cylinder 98 is actuated in response to the energization of the control circuit to extend piston rod 97 against its spring bias and pivot the lever 93 and soldering iron 81 downwardly about the horizontal pivot axis defined by pins 91. As the soldering iron 81 swings downwardly in its arcuate path of travel, the lower surface of the heated tip 85 thereof engages the distal end portion of the continuous solder strip 101, melting such portion and separating the same from the remainder of strip 101 as the tip 85 continues to advance toward the workpiece. The severed portion of solder forms a molten globule carried by tip 85 to the exposed surface of tab 53 at a point thereon whereat the two antenna wires 51 and 52 intersect. The heat transmitted by the molten solder burns the insulation from the antenna wires 51 and 52 while effecting the bond between such bared wire portions and tab 53. After a predetermined time, cylinder 98 is disabled, enabling the piston rod 97 to be retracted under the influence of the spring contained within cylinder 98 to raise soldering iron 81. After the soldering operation, apparatus 10 is disengaged from the work table 16 by withdrawing the pins 68 from bores 69 and returned to its elevated position in readiness for the next operation. Upon disengagement of the rollers 80 of switches 77 from the table front face 70 to open the control circuit, the timer controlling motor 115 becomes operative to energize the same, driving wheel 110 to feed a predetermined length of solder through the tube end portion 113 in readiness for the next soldering operation.

The heat imparted to the connecting tab 53 during the soldering operation and transmitted thereby to the underlying plastic material tends to soften the latter in the area adjacent such tab and can cause shifting of the same out of its desired position relative to the plastic sheet 50. To preclude such tab displacement and facilitate the dissipation of heat away from the soldered connection, means are provided for cooling the connection and the area adjacent thereto immediately after soldering. Such means comprise a tubular conduit 150 (FIGS. 3 and 4) suitably secured, as by clamps 151, to the upright plate 94 and connected via a suitable control valve (not shown) to a suitable source of air under pressure (also not shown). The conduit 150 terminates in a discharge outlet for directing a stream of air against the soldered connection. The control valve, which may be triggered by a microswitch or the like, is operable to interrupt the flow of air during the soldering operation and to supply air immediately thereafter.

The mounting plate 56, and thereby soldering iron 81 are axially adjustable relative to the frame 55 by means of the elongated slots 63 formed in the side support plates 60 and 61. Any axial adjustment of soldering iron 81 is dictated by the location of the workpieces, i.e., the intersecting antenna wires 51 and 52 on tab 53, relative to the front face 70 of table 16, and such location may vary according to the dimensions of the plastic sheets 50 and/or to the spacing of the forward marginal edge of the sheets 50 relative to the table front face 70, the adjustment of which can be controlled by the slotted guides 48.

From the foregoing, it is apparent that the objects of the present invention have been fully accomplished. The soldering apparatus of this invention is operative, in conjunction with a wire laying apparatus, to fixedly secure a connecting tab to a pair of antenna wire elements immediately after the latter are applied to a plastic interlayer. The soldering operation is effected at the wire laying station by the same operator attending the wire laying apparatus by merely positioning the soldering apparatus, facilitated by guide pins, relative to the work table to initiate operation of the soldering apparatus. When actuated, the latter is operative to remove an increment of solder, previously fed, from a continuous strip and deliver the same in a molten state to the crossed antenna wire portions on the tab, whereby the insulation of such portions is burned off and the bared portions then soldered to the connecting tab. The soldering iron tip is maintained clean and serviceable by the provision of a wetted wiper element mounted on the apparatus frame for periodic actuation after a given number of soldering cycles.

It is to be understood that the form of the invention herewith shown and described is to be taken as a preferred embodiment of the same, and that various changes in the shape, size, and arrangement of parts may be resorted to without departing from the spirit of the invention.

I claim:

1. A soldering apparatus comprising: a frame, a soldering iron having a tip, means mounting said soldering iron on said frame for pivotal movement relative thereto in an arcuate path between a position of rest and a position of use, a supply of solder in strip form mounted on said frame, means intermittently feeding an increment of said solder strip into said arcuate path of travel in spaced relation to said soldering iron tip when disposed in said position of rest, and means for actuating said soldering iron to swing the tip thereof into engagement with said solder strip and sever said increment therefrom for delivery to said position of use.

2. A soldering apparatus according to claim 1, wherein said feeding means comprises a drive wheel and an idler wheel having spaced peripheral surfaces between which said solder strip extends, and means for rotating said drive wheel to generate a traction force advancing said strip.

3. A soldering apparatus comprising: a frame, a soldering iron having a tip, means mounting said soldering iron on said frame for pivotal movement relative thereto in an arcuate path between an upper position of rest and a lower position of use, a supply of solder in strip form mounted on said frame, means intermittently feeding a predetermined length of said solder strip into said arcuate path of travel for engagement and severance by said soldering iron tip during movement thereof in said arcuate path toward said position of use, a sensing means on said frame engageable with a work supporting table, and means responsive to engagement of said sensing means with said table for actuating said soldering iron.

4. A soldering apparatus according to claim 3, including a counter operatively connected to said responsive means recording each soldering cycle.

5. A soldering apparatus according to claim 4, including means operatively connected to said counter for generating a signal upon completion of a predetermined number of soldering cycles.

6. A soldering apparatus comprising: a frame, a soldering iron having a tip, means mounting said soldering iron on said frame for pivotal movement relative thereto in an arcuate path between an upper position of rest and a lower position of use, a supply of solder in strip form mounted on said frame, means intermittently feeding a predetermined length of said solder strip into said arcuate path of travel for engagement and severance by said soldering iron tip during movement thereof in said arcuate path toward said position of use, and means mounted on said frame for removing excess solder from said soldering tip.

7. A soldering apparatus according to claim 6, wherein said removing means comprises an axially movable casing facing and in general registry with said tip when said soldering iron is in said position of rest, and a wiper element mounted in said casing for movement therewith and engageable with said soldering iron tip.

8. Apparatus for producing interlayers for antenna-type windshields comprising: a frame having a table for supporting a plastic sheet, means on said frame and overlying said table for applying and embedding antenna wire elements in said plastic sheet, means for soldering a connecting tab to intersecting portions of said antenna wire elements, and means detachably connecting said soldering means to said table.

9. Apparatus according to claim 8, wherein said soldering means comprises a soldering iron having a tip, a frame supporting said soldering iron for pivotal movement relative to said frame in an arcuate path between an upper position of rest and a lower position of use, and means for actuating said soldering iron.

10. Apparatus according to claim 9, wherein said connecting means comprises a pair of laterally spaced pins insertable into corresponding bores formed in the table front face for guiding said soldering means into a desired orientation relative to said antenna wire element intersecting portions.

11. Apparatus according to claim 10, wherein said soldering means includes sensing means engageable with said table when said soldering means attains said desired orientation for initiating operation of said actuating means.

12. Apparatus according to claim 9, wherein said soldering means includes a supply a solder in strip form and means for intermittently feeding a predetermined length of said solder strip into said arcuate path of travel for engagement and severance by said soldering iron tip during movement thereof in said arcuate path toward said position of use.

13. Apparatus according to claim 9, including means mounted on said supporting frame for removing accumulated solder from said soldering iron tip.

14. Apparatus according to claim 13, wherein said solder removing means comprises an axially movable casing facing and in general registry with said tip when said soldering iron is in said position of rest and a wiper element mounted in said casing for movement therewith and engageable with said soldering iron tip.

15. Apparatus according to claim 8, including means mounted on said soldering means for cooling the soldered connection between said tab and said intersecting portions of said antenna wire elements upon completion of the soldering operation.

* * * * *